J. MICHAL.
APPARATUS FOR PREPARATION OF CARBONIC ACID BATHS.
APPLICATION FILED NOV. 21, 1907.
955,182.
Patented Apr. 19, 1910.
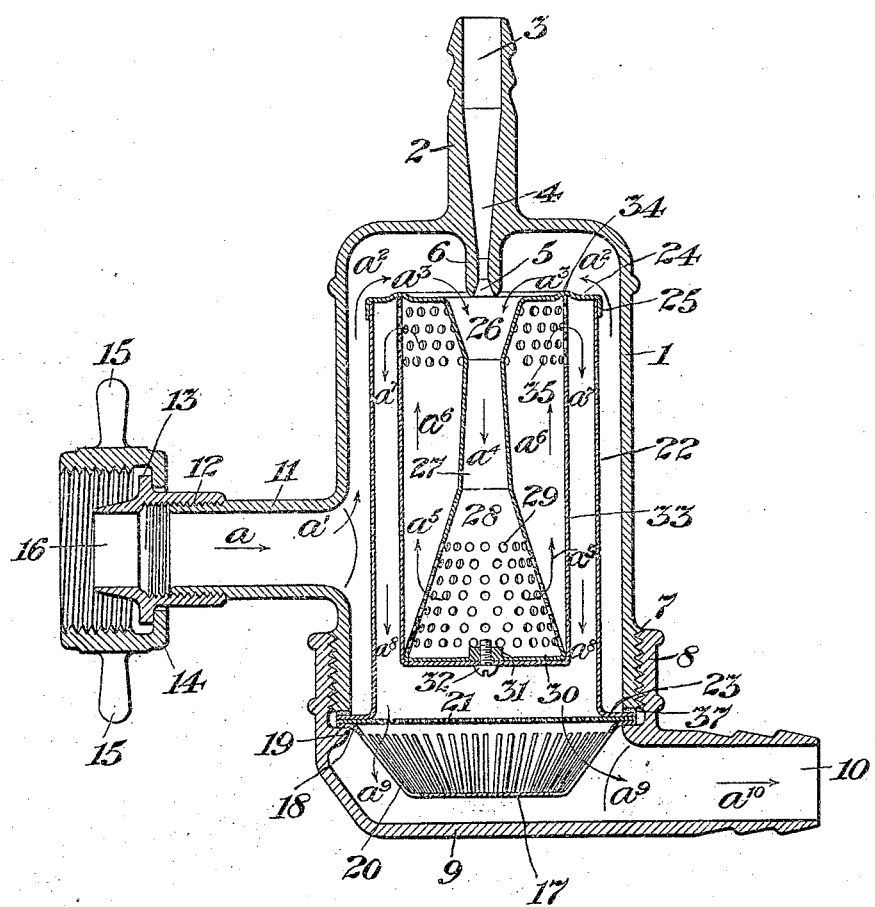

UNITED STATES PATENT OFFICE.

JAROSLAV MICHAL, OF NEW YORK, N. Y.

APPARATUS FOR PREPARATION OF CARBONIC-ACID BATHS.

955,182. Specification of Letters Patent. Patented Apr. 19, 1910.

Application filed November 21, 1907. Serial No. 403,183.

*To all whom it may concern:*

Be it known that I, JAROSLAV MICHAL, a subject of the Emperor of Austria-Hungary, residing in New York, county of New York, and State of New York, have invented a new and useful Improvement in Apparatus for Preparation of Carbonic-Acid Baths, of which the following is a description.

This invention relates to apparatus for impregnating water with carbonic acid gas, and has particular reference to apparatus to be used for the purpose of providing charged water for the bath, or other similar purposes.

Among the objects of my invention may be noted the following: to provide an apparatus by means of which water for bathing purposes may be charged with carbonic acid gas automatically, rapidly, and conveniently; to provide an apparatus by means of which water for the bath can be charged with carbonic acid gas to just the desired degree required for bathing purposes, instead of being overcharged as is the case with water provided by what is known as the soda-water apparatus; and to provide a portable apparatus which can be used in residences and easily manipulated for the various purposes.

With the above objects in view, and others which will be pointed out during the course of this description, my invention relates to the parts, features, elements and combinations of elements hereinafter described and claimed.

In order that my invention may be clearly understood, I have shown in the accompanying drawings a figure illustrating in vertical, transverse section an apparatus involving the features and principles of my invention.

Referring to the drawing, the numeral 1 indicates the frame of the apparatus, which may be cylindrical, or have any other suitable shape or form desired, the same being provided at its top with the vertical stem 2 through which a passage is formed, the outer end 3 of which is of substantially uniform diameter and which passage is made gradually smaller toward the bottom of the stem, as indicated at 4, and terminates in a flared portion 5 in the depending continuation 6, of the stem 2, and which operates as a gas-injector, as will be presently described.

The bottom of the frame 1 is open and, near its open end, is screw-threaded on its outer surface, as indicated at 7, for the reception of the screw-threaded rim 8 of the bottom frame 9, which latter is provided with the water-outlet 10. The frame 1 is also provided with the inlet 11, above its bottom, the outer end of which, on its outer surface, is screw-threaded for the reception of the screw-threaded nipple 12 provided with the circumferential flange 13, which holds the interiorly screw-threaded coupling 14, the latter being provided with handles 15 for manipulation. This coupling 15 is for the purpose of screwing on to a pipe or water inlet; and the nipple 12 is provided with the reduced outer end portion 16, which projects a short distance into the coupling 14. Suspended within the bottom of the frame is a concaved screen or baffle 17, the same being held in the position shown by means of the rim 18, which rests upon the flange 19 of the frame-bottom 9. The baffle 17 is provided with a plurality of longitudinal slots 20 extending from the bottom thereof toward the top.

Extending transversely across the bottom of the frame 1 and screening the entrance to the baffle 17, and resting upon the rim 18 of the latter, is a foraminous diaphragm 21, the latter being composed of wire-netting or thin, perforated metal, or any other suitable material. Within the frame 1, and extending longitudinally thereof, is a hollow cylinder 22, which rests, by its outturned flange 23, upon the diaphragm 21 and extends to near the top of the frame 1, said cylinder being of such diameter as to leave a large water-space between the same and the wall of the frame 1. At its top, the cylinder is provided with a cover 24, the depending flange 25 of which produces a snug fit, said cover being extended into a tubular, central depending portion, the upper end of which is formed into the upwardly flared passage 26 and an elongated, downwardly flared continuation passage 27 terminating in the enlarged bell or funnel-shaped chamber 28, the side walls of which are perforated at 29 and the bottom 30 of which is closed and provided centrally with a screw-threaded teat 31. To the bottom 30 of the chamber 28 is secured, by screw 32 tapped into said teat, the bottom of a casing 33, which extends around the tubular portion of the cover 24, within the cylinder 22, and vertically to said cover, the upper end of which casing is also closed by said cover, a snug fit being produced by the circular flange 34, which forms a groove within which the upper edge of said casing 33 is perforated as at 35. When the parts have been set properly in position, it will be seen that the casing 33 is supported by the depending, tubular portion of the cover 24, and that the latter is supported by the cylinder 22, which, in turn, is supported by the flange 19 of the bottom of the frame 1. The parts being in the position illustrated in the figure, the bottom 9 is screwed on to the lower end of the frame 1 until the baffle 17, diaphragm 21 and cylinder 22 are tightly clamped between the flange 19 and the lower end of the frame 1, a circular washer 37 being interposed for the purpose of preventing the escape of the fluids.

With the above detail description of the construction of my apparatus, the operation thereof will be apparent from the following:

The upper end of the stem 2 is inserted in any suitable tubular connection with a tank containing carbonic acid gas under pressure, such tanks being well-known commercial devices. The coupling 14 is then connected to a spigot, or other pipe connection with a water-main or tap, and the apparatus is ready for use, and will be placed in convenient position for filling a bath-tub or other receptacle where the water is intended to be used. The water and gas will now be turned into the apparatus, the gas, under regulatable pressure, flowing rapidly through the stem 2 and into the apparatus, the tubular portion 6, extending into the frame 1 and passage 26, acting as an injector. The water entering at 16 will pass in the direction of the arrow $a$ into the space between the frame 1 and the cylinder 22 and, filling said space below the inlet, will pass upwardly in the direction of the arrow $a'$ and over the top of the cover 24 in the direction of the arrows $a^2$, and thence down into the passage 26, as indicated by the arrows $a^3$, and down into the chamber 28, as indicated by the arrow $a^4$, through the perforations of which it will pass, as indicated by the arrows $a^5$, into the casing 33, and thence upwardly, as indicated by the arrows $a^6$ and through the apertures at the top of said casing 33, as indicated by the arrows $a^7$, into the space between said cylinder 22 and the casing 33 and downwardly, as indicated by the arrows $a^8$, through the diaphragm 21 and baffle 17 into the bottom 9 of the frame, as indicated by the arrows $a^9$, and thence outwardly through the outlet-pipe 10, as indicated by the arrow $a^{10}$, into the bath-tub or other receptacle where it is to be used.

During the passage of the water, as indicated, the gas will enter the passage 26 through the injector 6, and become mixed with the water in said passage and in the chamber 28 below the same, and in its passage through the apparatus, as indicated with reference to the water, will become thoroughly mixed with the latter, as will be readily understood. Obviously, as the gas enters through the stem 2, it will have a tendency to create a vacuum in the chamber of the frame above the cover 24, on account of the rapid movement of the gas through the passage 26, which will result in causing a free and rapid passage of the water into the upper part of the frame and down through the passage 26. Furthermore, the rapid passage of the water through the tubular portions 26, 27 and 28, will result in materially breaking up the water and thus rendering it more susceptible to the absorption of gas, resulting in a more thorough mixture of the two fluids. The perforated chamber 28, the perforated casing 33, and the diaphragm 21, in addition to the baffle 17, all act as baffles to the rapid passage of the water, and also aid in breaking the latter into globules and rendering it more susceptible to the absorption of gas. These devices and their operations also aid in the thorough mixing of the two fluids; but, it being understood that in this manner of mixing the two fluids, the water will absorb only just as much as it naturally and chemically can in contradistinction to being impregnated to the fullest extent of its holding capacity, as would be the result if the water were confined and the gas forced thereinto under high pressure. It will also be readily understood that, if the gas should not be under sufficient pressure to cause the stem 2 and tube 6 to operate as an injector, the water entering at 16 under pressure would very quickly form a strong current upwardly to the top of the frame 1 and down into the tubular portions 26, 27 and 28, thus having a tendency to create a vacuum in the stem 2, which would result in drawing the gas through the stem 2 at considerable speed, thus giving to the stem 2 and nipple 6 the operation of a partial injector.

From the mode of operation just described, and the description of structural features, it will be apparent that I have produced a simple and compact apparatus by means of which water may be automatically and continuously impregnated to the desired extent with carbonic acid gas for bathing purposes.

Having thus described my invention, what I claim and desire to secure by Letters Patent is:

1. In combination, a frame, having a water-inlet between its ends at one side, a water-outlet at its bottom, and a gas-inlet at its top, the gas-inlet being extended within the said frame in the form of an injector-tube, and means within the frame for mixing the water and gas and causing the combined fluids to follow a circuitous path within the frame from top to bottom thereof in its passage from the water-inlet to the water-outlet, said means including a cylinder supported in the casing and having a central, depending, tubular portion provided with apertures for the passage of the fluids.

2. In combination, a frame having a water-inlet, a water-outlet and a gas-inlet, a cylinder arranged in said frame, a casing arranged within the cylinder having foraminous walls, a tubular passage in the said casing in line with the gas-inlet, and a series of baffles arranged within the frame for mixing the fluids and retarding their passage through the frame.

3. In combination, a frame having a water-inlet and a water-outlet, means within the frame for mixing gas and water comprising a casing having a conical chamber and a tubular portion leading to the latter, and a gas-injector arranged in alinement with said tubular portion for injecting gas thereinto and causing the proper flow of water through the mixing means and the frame.

4. In combination, a frame having a water-inlet, a water-outlet and a gas-inlet, a baffle arranged in the frame near the bottom thereof, a foraminous diaphragm extending across the top of said baffle, a cylinder having an open bottom and provided with a cover having a central, depending, tubular portion, and a casing supported by said tubular portion, said tubular portion and casing being both provided with apertures for the passage of the fluids.

In testimony whereof I have hereunto signed my name in the presence of two subscribing witnesses.

JAROSLAV MICHAL.

Witnesses:
FLORENCE ATEN IVES,
CHAS. McC. CHAPMAN.